US012309173B2

United States Patent
Han et al.

(10) Patent No.: US 12,309,173 B2
(45) Date of Patent: May 20, 2025

(54) PERFORMANCE MONITORING IN THE ANOMALY DETECTION DOMAIN FOR THE IT ENVIRONMENT

(71) Applicant: International Business Machines Corporation, Armonk, NY (US)

(72) Inventors: Shirley M. Han, New York, NY (US); Anbang Xu, San Jose, CA (US); Rama Kalyani T. Akkiraju, Cupertino, CA (US); Salil Ahuja, Washington, DC (US); Xiaotong Liu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 513 days.

(21) Appl. No.: 17/344,751

(22) Filed: Jun. 10, 2021

(65) Prior Publication Data

US 2022/0400121 A1   Dec. 15, 2022

(51) Int. Cl.
*H04L 9/40* (2022.01)
*G06N 5/04* (2023.01)
*G06N 20/00* (2019.01)

(52) U.S. Cl.
CPC .......... *H04L 63/1416* (2013.01); *G06N 5/04* (2013.01); *G06N 20/00* (2019.01)

(58) Field of Classification Search
CPC ... H04L 63/1416; H04L 63/1425; G06N 5/04; G06N 20/00; G06N 5/025; G06F 21/552; G06F 21/554; G06F 11/3466; G06F 11/302; G06F 11/3055; G06F 11/3409
See application file for complete search history.

(56) References Cited

U.S. PATENT DOCUMENTS

| 10,599,957 | B2 | 3/2020 | Walters |
| 10,970,182 | B2 | 4/2021 | Chafle |
| 2017/0372232 | A1 | 12/2017 | Maughan |
| 2018/0096261 | A1 | 4/2018 | Chu |
| 2018/0247220 | A1* | 8/2018 | Assem Aly Salama ...... G06N 20/00 |
| 2020/0076677 | A1* | 3/2020 | Mermoud ........... H04L 41/0631 |

(Continued)

FOREIGN PATENT DOCUMENTS

CN   110956278 A   4/2020

OTHER PUBLICATIONS

Anonymously, "Compressed Sensing for Monitoring of an Application," IP.com No. IPCOM000252103D, Dec. 15, 2017, 33 pages.

(Continued)

*Primary Examiner* — Sanjiv Shah
*Assistant Examiner* — Samuel C Sharpless, III
(74) *Attorney, Agent, or Firm* — Anthony Curro

(57) ABSTRACT

An approach is disclosed that retrieves a set of current system data corresponding to a computer system and a set of current outputs from an anomaly detection model that is monitoring the computer system. The current system data and the anomaly detection model outputs are input to a trained anomaly detection supervisor model. The trained anomaly detection supervisor model processes the inputs and provides a set of performance data corresponding to the anomaly detection model. The anomaly detection model is then adjusted when the set of performance data indicates that the anomaly detection model is performing below a threshold.

20 Claims, 6 Drawing Sheets

(56) References Cited

U.S. PATENT DOCUMENTS

2021/0209486 A1* 7/2021 Fan ..................... G06N 20/20

OTHER PUBLICATIONS

Liu et al., "Opprentice: Towards Practical and Automatic Anomaly Detection Through Machine Learning," Proceedings of the 2015 Internet Measurement Conference, pp. 1-14, Oct. 2015, New York, NY.

Yuan et al., "Ada: Adaptive Deep Log Anomaly Detector," IEEE Infocom 2020—IEEE Conference on Computer Communications, pp. 2449-2458, Jul. 2020.

* cited by examiner

PERFORMANCE MONITORING IN THE ANOMALY DETECTION DOMAIN FOR THE IT ENVIRONMENT

BACKGROUND

Information Technology (IT) Operations management is a complex task for companies as digital transformation is rapidly happening around the world. Each year, companies face outages that impact revenue, labor cost, company reputation, and customer satisfaction negatively. It is crucial to have a method for companies to monitor performance efficiently and take appropriate actions when it comes to anomaly detection in their current workflow. Machine learning models are often implemented to perform anomaly detection in an IT environment. However, currently, there is no accurate way to monitor the performance of these models and monitor data drift. This information is needed in order to allow Site Reliability Engineers (SREs) to evaluate the IT environment and make appropriate decisions regarding the actions to take regarding anomaly detection. System data, such as system logs, metrics data, and topology information changes from time to time. Understanding when anomaly detection machine learning models require retraining is difficult, especially with a poor understanding of the current anomaly detection model's performance. Training of the anomaly detection model takes time and resources. Consequently, SREs attempt to avoid unnecessary training of the anomaly detection model. However, an anomaly detection model that is under-performing may not correctly detect anomalies in the computer system that it is monitoring, potentially leading to security breaches and other system problems.

SUMMARY

An approach is disclosed that retrieves a set of current system data corresponding to a computer system and a set of current outputs from an anomaly detection model that is monitoring the computer system. The current system data and the anomaly detection model outputs are input to a trained anomaly detection supervisor model. The trained anomaly detection supervisor model processes the inputs and provides a set of performance data corresponding to the anomaly detection model. The anomaly detection model is then adjusted when the set of performance data indicates that the anomaly detection model is performing below a threshold.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
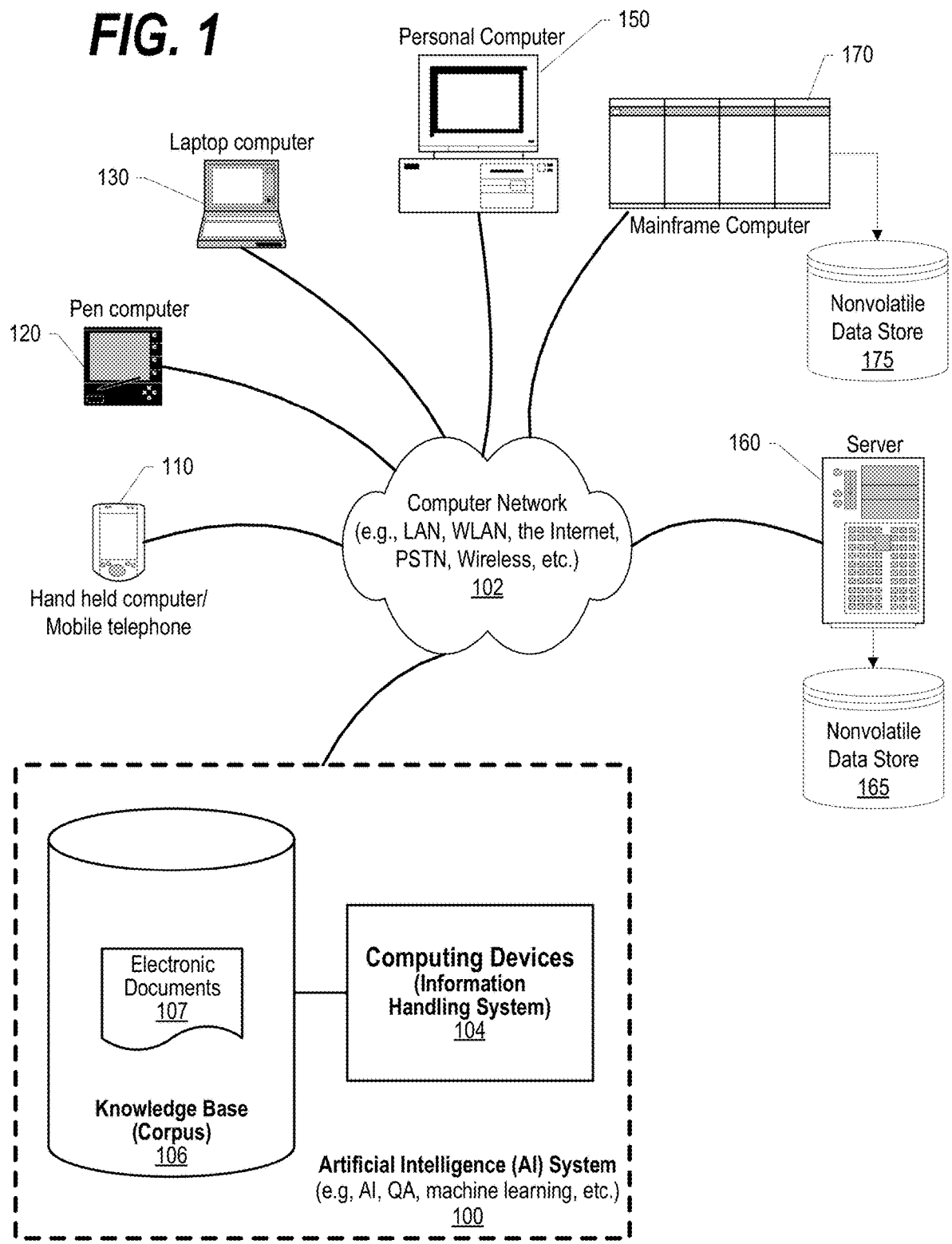
FIG. 1 depicts a network environment that includes a knowledge manager that utilizes a knowledge base.

FIGS. 1-6 describe an approach to perform performance monitoring in the anomaly detection domain for the information technology (IT) environment. The approach described herein involves automatically monitoring performance in the anomaly detection domain by using machine learning and rule-based methods that determine model performance. The approach monitors distribution changes and micro service interactions from the topology, and provides continuous model enhancement from user feedback. System data, such as system logs, metric data, and topology information are used as inputs for this approach as are outputs (data) from the anomaly detection model current running in the environment. These inputs are utilized for the supervised machine learning model that monitor anomaly detection model performance as well as monitoring data drift. Data drift is a change in distribution of data used by the anomaly detection model over time. When the baseline data set on which the anomaly detection model was trained differs from the current real-time production data being processed by the anomaly detection model, the model's performance can degrade, sometimes significantly. The approach generates performance monitoring results and recommended actions for the existing trained model for anomaly detection by utilizing supervised machine learning model and rule-based method that determine whether retraining is necessary. In addition, the approach can identify thresholds that might require tuning. The approach trains a supervisor machine learning model that monitors performance of the anomaly detection model and detects data drift in the model data. Through the supervised machine learning model and rule-based method, the anomaly detection model accuracy is determined and recommended actions are identified. In this manner, the approach improves existing anomaly detection models in the IT environment and assists in identifying anomalies in the IT operation environment more accurately.

The approach addresses the problem of poorly performing anomaly detection models in three key areas. First, the approach analyzes anomaly detection model performance when "ground truth" exists by examining evaluation metrics, such as precision, accuracy, and F1 scores. Secondly, the supervisor machine learning model predicts distribution changes based on the current anomaly detection model and make suggestions to improve performance and accuracy of the anomaly detection model. The supervisor model is trained based on system data as well as data (e.g., logs, metrics, topology information, etc.) as well as outputs from the current anomaly detection model (e.g., inference datasets, count vectors, etc.). For monitoring distribution changes, log templates and count vectors are generated from input logs and continuous monitored for data drift. Log templates, count vectors, and also metric data are continuously being matched to check if the ratio is below a defined threshold for a given time window. In one embodiment, log templates are generated from all logs that are input and count vectors are distributions of templates extracted from log messages. If the ratio is consistently below the threshold, implying consistent data drift, then retraining of the model is suggested to the SRE. In addition, old and new inference datasets that were generated by the current anomaly detection model are compared in a rule-based fashion to assist with the data drift analysis and with providing recommendations to the SRE. In addition, the interaction of different micro services is monitored with the provided topology information. The monitoring of micro-services interactions provides suggestions regarding reconfiguration of connections for various microservices. Lastly, user feedback is used to adjust the supervisor model thresholds as well as tuning of future recommended actions. In this manner, the approach provides a dynamic monitoring system and tailored recommended actions with regards to retraining anomaly detection models as well as threshold tuning for anomaly detection models of each micro-service.

FIG. 1 depicts a schematic diagram of one illustrative embodiment of artificial intelligence (AI) system 100 in a computer network 102. AI system 100 includes artificial intelligence computing device 104 (comprising one or more processors and one or more memories, and potentially any other computing device elements generally known in the art including buses, storage devices, communication interfaces, and the like) that connects AI system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. AI system 100 and network 102 may enable functionality, such as question/answer (QA) generation functionality, for one or more content users. Other embodiments of AI system 100 may be used with components, systems, sub-systems, and/or devices other than those that are depicted herein.

AI system 100 maintains knowledge base 106, also known as a "corpus," which is a store of information or data that the AI system draws on to solve problems. This knowledge base includes underlying sets of facts, assumptions, models, and rules which the AI system has available in order to solve problems.

AI system 100 may be configured to receive inputs from various sources. For example, AI system 100 may receive input from the network 102, a corpus of electronic documents 107 or other data, a content creator, content users, and other possible sources of input. In one embodiment, some or all of the inputs to AI system 100 may be routed through the network 102. The various computing devices on the network 102 may include access points for content creators and content users. Some of the computing devices may include devices for a database storing the corpus of data. The network 102 may include local network connections and remote connections in various embodiments, such that artificial intelligence 100 may operate in environments of any size, including local and global, e.g., the Internet. Additionally, artificial intelligence 100 serves as a front-end system that can make available a variety of knowledge extracted from or represented in documents, network-accessible sources and/or structured data sources. In this manner, some processes populate the artificial intelligence with the artificial intelligence also including input interfaces to receive knowledge requests and respond accordingly.

In one embodiment, the content creator creates content in electronic documents 107 for use as part of a corpus of data with AI system 100. Electronic documents 107 may include any file, text, article, or source of data for use in AI system 100. Content users may access AI system 100 via a network connection or an Internet connection to the network 102, and, in one embodiment, may input questions to AI system 100 that may be answered by the content in the corpus of data. As further described below, when a process evaluates a given section of a document for semantic content, the process can use a variety of conventions to query it from the artificial intelligence.

Types of information handling systems that can utilize AI system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
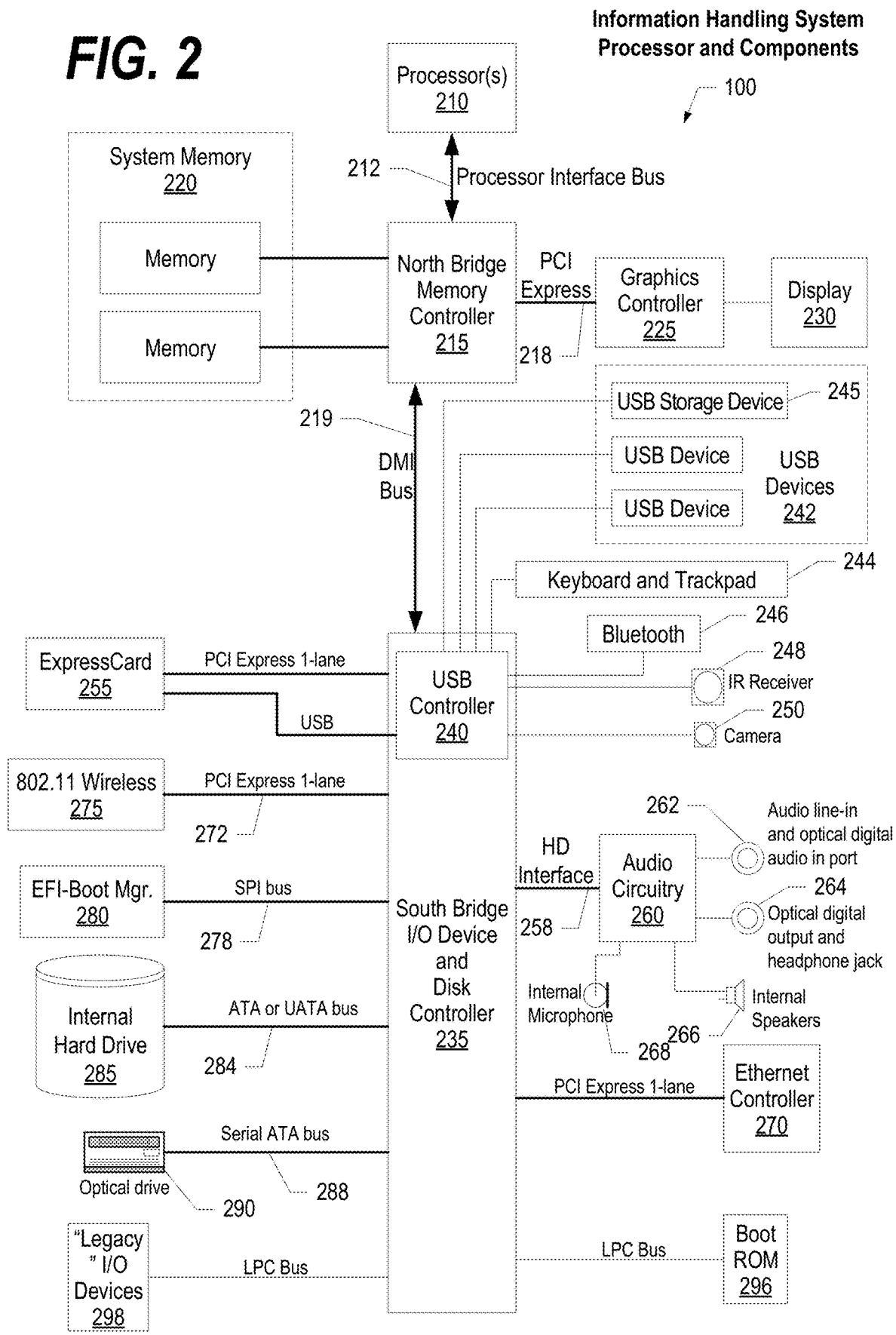
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
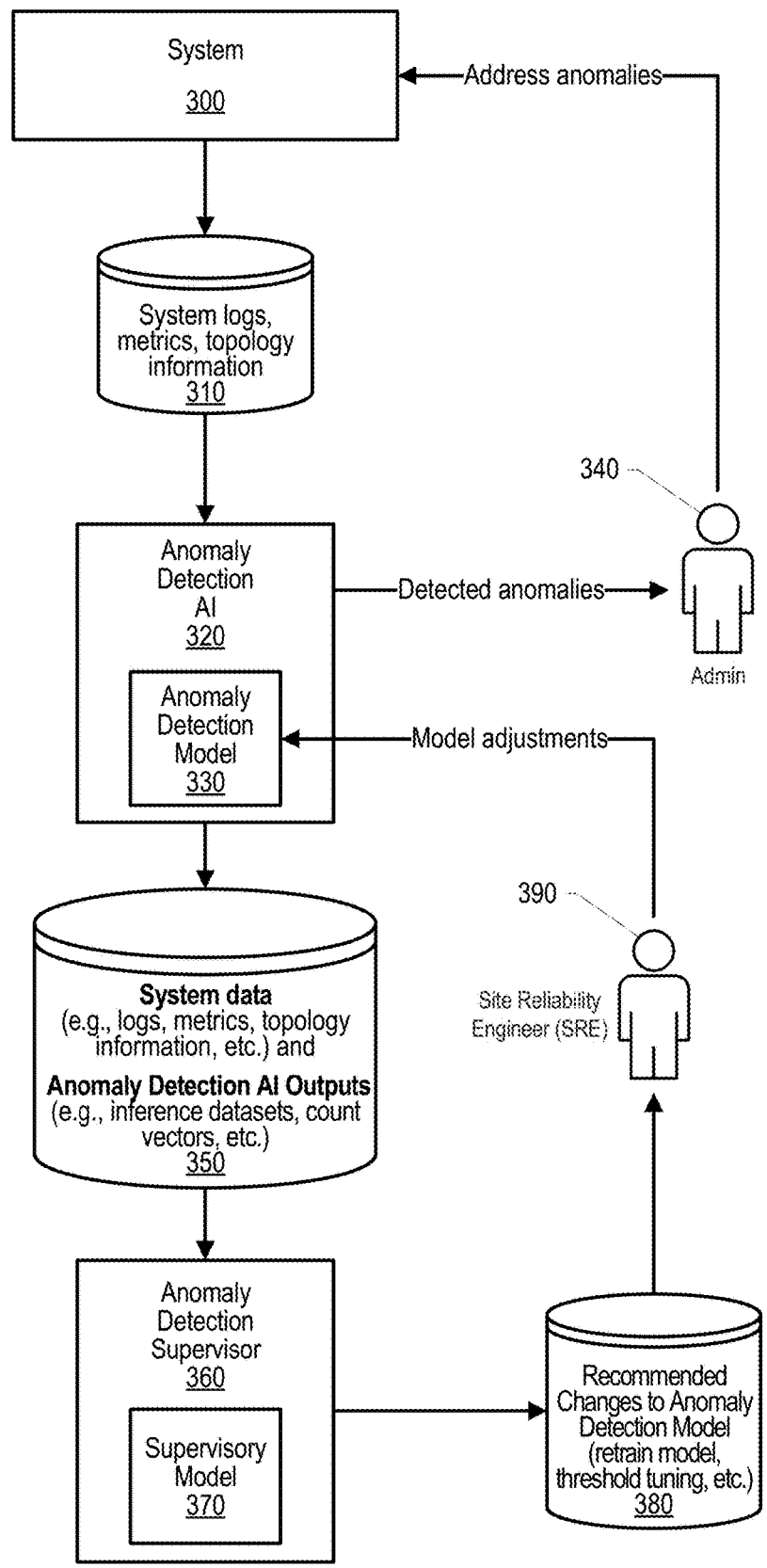
FIG. 3 is a component diagram that shows various components and interactions to perform performance monitoring in the anomaly detection domain for the information technology (IT) environment.

FIG. 3 is a component diagram that shows various components and interactions to perform performance monitoring in the anomaly detection domain for the information technology (IT) environment. Computer system 300 is being monitored for anomalies by anomaly detection artificial intelligence (AI) system 320 that uses trained anomaly detection model 330 to detect anomalies within system 300. Anomaly detection system 320 receives data from the monitored computer system by way of various system data 310 gathered from the system. This system data includes system logs, performance metric data (e.g., average load data, available memory data, CPU usage data, available disk space data, running processes data, etc.). Anomalies that are detected by anomaly detection AI system 320 are provided to system administrator 340. The system administrator can then take actions to address the anomalies to improve the performance of system 300.

Anomaly detection supervisor 360 is an AI system that utilizes trained supervisory model 370 to determine whether anomaly detection model 330 is operating within parameters. The anomaly detection supervisor receives inputs 350 that include both system data as well as the outputs of the anomaly detection model. The system data inputs include system logs, metrics, topology information and the like. The outputs from the anomaly detection model that are used as inputs to supervisory model 370 include inference datasets, count vectors, and other outputs of the anomaly detection model.

After inputting data 350, the trained anomaly detection supervisor results in results 380. These results may include recommendations for adjustments to the anomaly detection model. These adjustments may include a recommendation to retrain the anomaly detection model, a recommendation to tune the thresholds used by the anomaly detection model, and other adjustments to the anomaly detection model. The recommended changes are provided to Site Reliability Engineer (SRE) or other professional that is responsible for maintaining the anomaly detection system. The SRE can then make recommended model adjustments to the anomaly detection model, such as retraining the model and the like.

Figure 4:
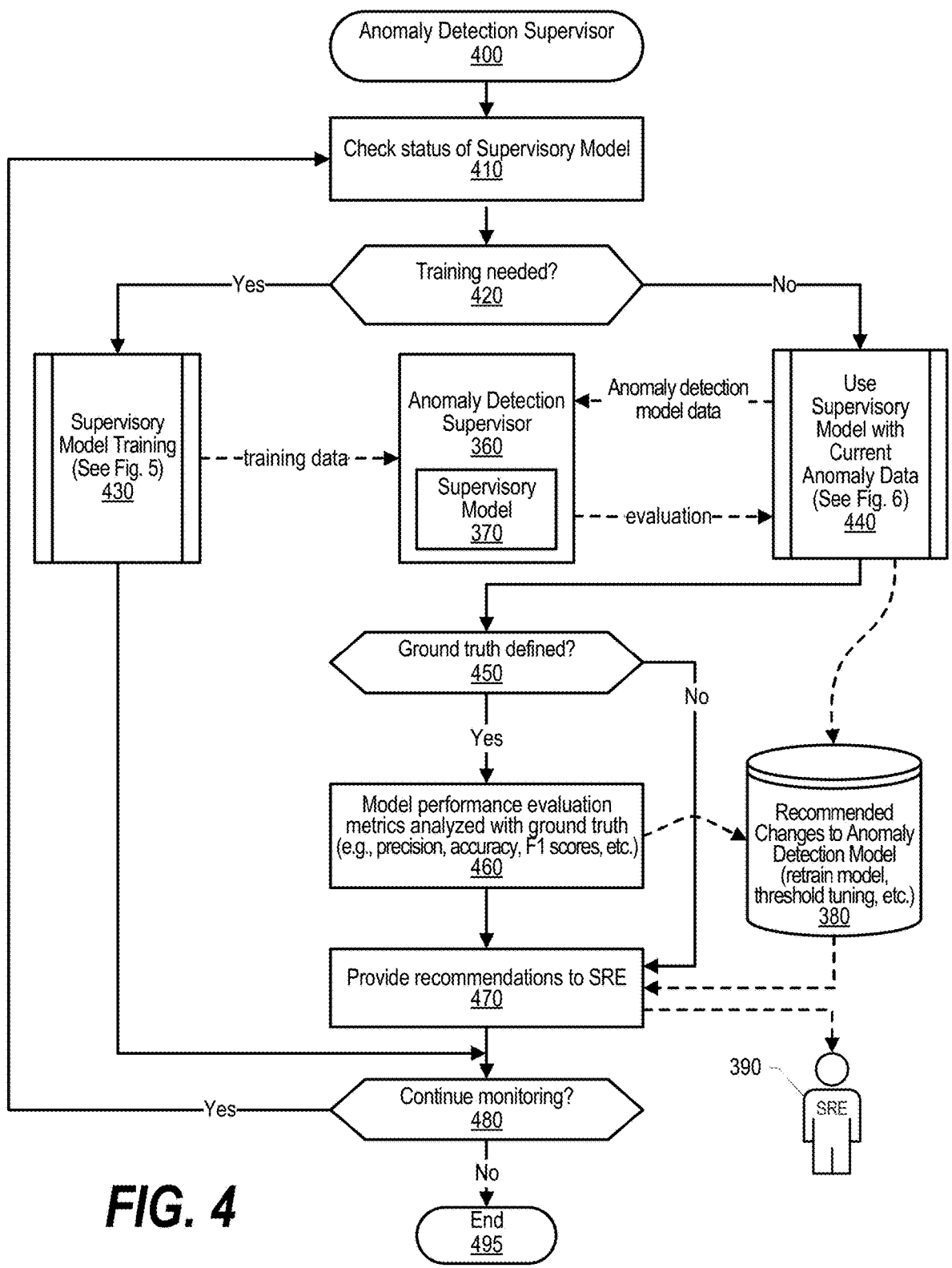
FIG. 4 is a depiction of a flowchart showing the logic used by an anomaly detection supervisor.

FIG. 4 is a depiction of a flowchart showing the logic used by an anomaly detection supervisor. FIG. 4 processing commences at 400 and shows the steps taken by a process performed by an anomaly detection supervisor artificial intelligence (AI) system. At step 410, the process checks the status of a supervisory machine learning model that is used by the anomaly detection supervisor. The process determines as to whether training of the supervisory model is needed, such as if this is the first time that the anomaly detection supervisor has been run on this system (decision 420).

Figure 5:
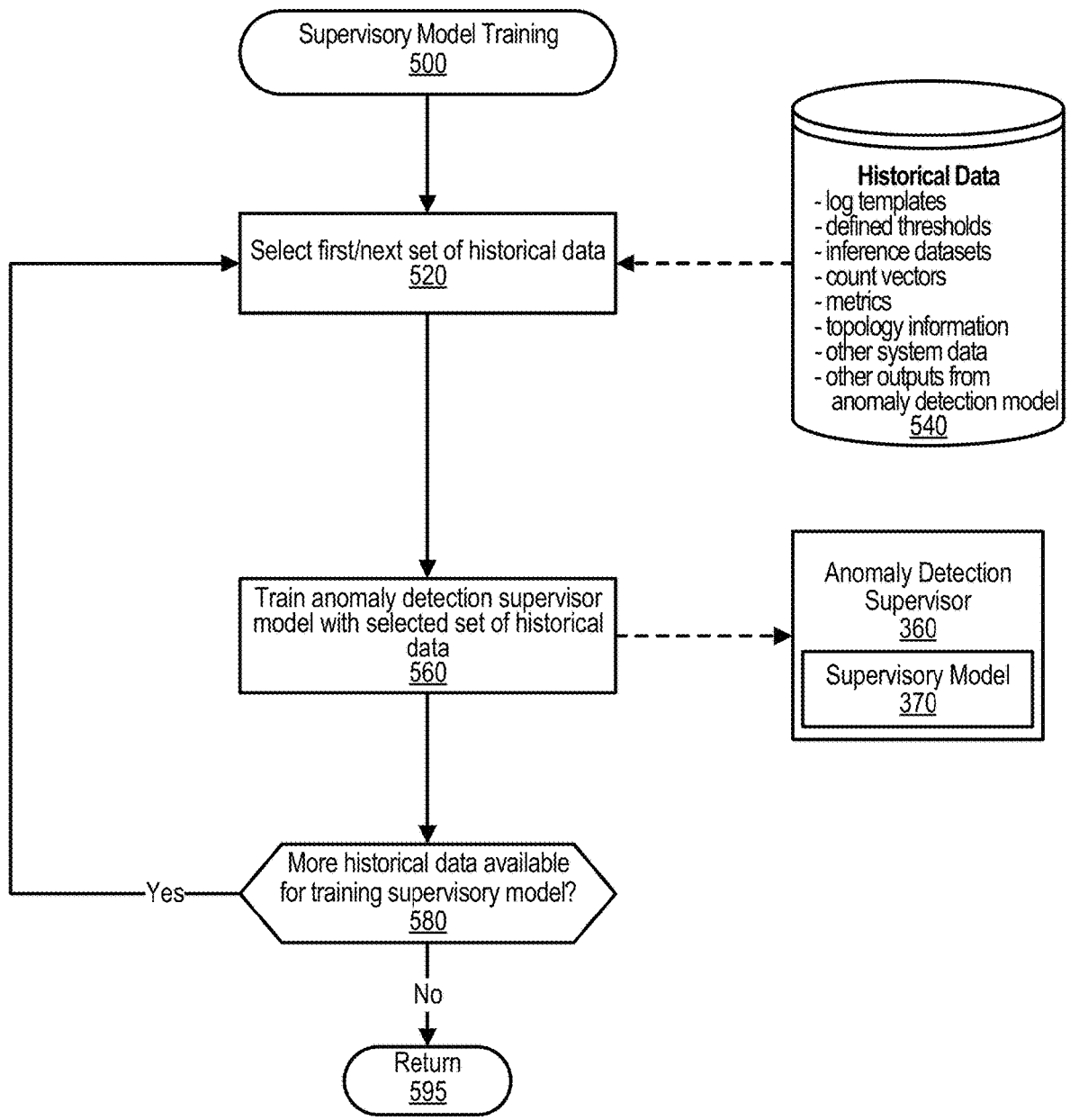
FIG. 5 is a depiction of a flowchart showing the logic used to train the supervisory model.

If training of the supervisor model is needed, then decision 420 branches to the 'yes' branch whereupon, at predefined process 430, the supervisory model training process is performed (see FIG. 5 and corresponding text for details). As shown, this results in training data being provided to supervisory model 370 so that the model is trained for the anomaly detection model that is being used in the computer system. On the other hand, if the supervisory model has already been trained, then decision 420 branches to the 'no' branch to perform steps 440 through 470.

Figure 6:
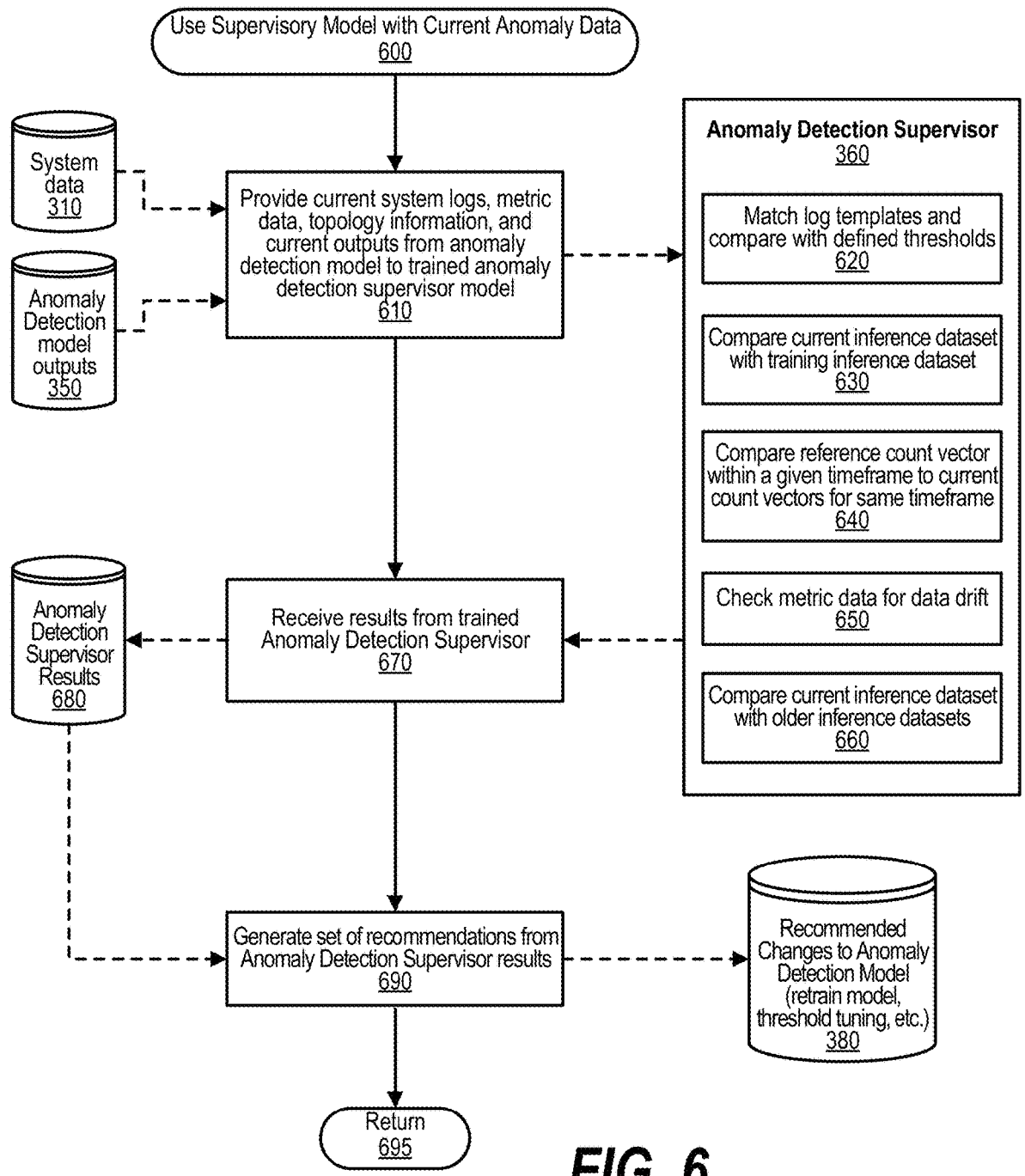
FIG. 6 is a depiction of a flowchart showing the logic used by the trained supervisory model to monitor performance of an anomaly detection model.

At predefined process 440, the process performs the Anomaly Supervisor using the trained Supervisory Model (see FIG. 6 and corresponding text for processing details). As shown, current anomaly detection model data is input to anomaly detection supervisor 360 with trained supervisory model 370. Based on the training of the supervisory model, the supervisor returns evaluation data to predefined process 440. The evaluation data is processed to form recommendations for adjusting and managing the anomaly detection model that are stored in data store 380. The process determines as to whether a set of ground truth data has been defined for the anomaly detection system (decision 450). If ground truth has been defined, then decision 450 branches to the 'yes' branch whereupon, at step 460, the process analyzes the anomaly model's using evaluation metrics with predefined ground truth data (e.g., ground truth regarding precision, accuracy, F1 scores, etc.). Determinations made based on ground truth data are formed into recommendations regarding the anomaly detection model and are stored in data store 380. On the other hand, if ground truth is not defined, then decision 450 branches to the 'no' branch bypassing step 460. At step 470, the process provides the recommendations stored in data store 380 to Site Reliability Engineer (SRE) 390.

The process determines as to whether to continue monitoring the anomaly detection model using the supervisor (decision 480). If monitoring of the anomaly detection model continues, then decision 480 branches to the 'yes' branch which loops back to step 410 to repeat the process described above. This looping continues until monitoring of the anomaly detection model ceases, such as when the system is shutdown, at which point decision 480 branches to the 'no' branch exiting the loop. FIG. 4 processing thereafter ends at 495.

FIG. 5 is a depiction of a flowchart showing the logic used to train the supervisory model. FIG. 5 processing commences at 500 and shows the steps taken by a process that performs supervisory model training. At step 520, the process selects the first set of historical data from data store 540. The historical data used to train the supervisory model include such data as log templates, defined thresholds, inference datasets, count vectors, system metrics, system topology information, and other system data. At step 560, the process trains anomaly detection supervisor model 370 with the selected set of historical data.

The process determines as to whether there is more historical data to use for training the supervisory model (decision 580). If more historical data available for training the supervisory model, then decision 580 branches to the 'yes' branch which loops back to step 520 to select the next set of historical data to train model 370. This looping continues until all of the available historical data to train the model has been used, at which point decision 580 branches to the 'no' branch exiting the loop. FIG. 5 processing thereafter returns to the calling routine (see FIG. 4) at 595.

FIG. 6 is a depiction of a flowchart showing the logic used by the trained supervisory model to monitor performance of an anomaly detection model. FIG. 6 processing commences at 600 and shows the steps taken by the trained supervisory model to process current anomaly data to determine if the anomaly detection model is performing adequately. At step 610, the process provides system data (e.g., current system logs, metric data, topology information), and current outputs from the anomaly detection model (inference dataset, count vectors, etc.) to anomaly detection supervisor 360 that has a trained supervisory model. Anomalies Detection Supervisor 360 performs various analyses (620 through 660) using the provided data to form results pertaining to the performance of the anomaly detection model.

At analysis 620, the anomaly detection supervisor matches log templates and compares them with defined log template thresholds. At analysis 630, the anomaly detection supervisor compares the current inference dataset from the anomaly detection model with the training inference dataset that was used to train the supervisor model. At analysis 640, the anomaly detection supervisor compares the reference count vector within a given timeframe from the anomaly detection model to current count vectors for the same timeframe. At analysis 650, the anomaly detection supervisor checks metric data for data drift. At analysis 660, the anomaly detection supervisor compares the current inference dataset with older inference datasets.

The analyses performed by the anomaly detection supervisor form a set of results that are received at step 670 and stored in data store 680. At step 690, the process generates a set of recommendations based on the Anomaly Detection Supervisor results that were stored in data store 680. For example, a recommendation may be to retrain the anomaly detection model because of data drift that was detected by the anomaly detection supervisor. FIG. 6 processing thereafter returns to the calling routine (see FIG. 4) at 695.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method, implemented by an information handling system that includes a processor and a memory, the method comprising:
    outputting a set of current system data corresponding to a computer system and a set of current outputs from an anomaly detection model that is monitoring the computer system;
    inputting the set of current system data and the set of current outputs to a trained anomaly detection supervisor model including inputting a set of current system log templates to the trained anomaly detection supervisor model that compares the set of current system log templates to one or more sets of older system log templates, wherein the comparison results in one of performance data that indicates whether the anomaly detection model is performing below a threshold;
    receiving, from the trained anomaly detection supervisor model, a set of performance data corresponding to the anomaly detection model, wherein the received performance data is based on the set of current system data and the set of current outputs; and
    adjusting the anomaly detection model in response to the set of performance data indicating that the anomaly detection model is performing below the threshold.

2. The method of claim 1 further comprising:
    training an anomaly detection supervisor model, wherein the training results in the trained anomaly detection supervisor model, and wherein the training further comprises:
        inputting a training inference dataset to the anomaly detection supervisor model, wherein the training inference dataset is an output of the anomaly detection model that is monitoring the computer system; and wherein the adjusting of the anomaly detection model is selected from the group consisting of retraining the anomaly detection model, changing one or more metrics used by the anomaly detection model, and changing one or more thresholds used by the anomaly detection model.

3. The method of claim 2 further comprising:

receiving a current inference dataset that is output from the anomaly detection model that is monitoring the computer system; and using the trained anomaly detection supervisor model to compare the current inference dataset with one or more older inference datasets, wherein one of the older inference datasets is the training inference dataset, wherein the comparing results in one of the performance data that indicates whether the anomaly detection model is performing below the threshold.

4. The method of claim 1 further comprising:

training an anomaly detection supervisor model, wherein the training results in the trained anomaly detection supervisor model, and wherein the training further comprises:

inputting a training reference count vector corresponding to a predetermined timeframe to the anomaly detection supervisor model, wherein the training reference count vector is an output of the anomaly detection model that is monitoring the computer system.

5. The method of claim 4 further comprising:

receiving a reference count vector that is output from the anomaly detection model that is monitoring the computer system; and using the trained anomaly detection supervisor model to compare the current reference count vector with one or more older reference count vectors, wherein one of the older reference count vectors is the training reference count vector, wherein the comparing results in one of the performance data that indicates whether the anomaly detection model is performing below the threshold.

6. The method of claim 1 further comprising:

inputting a set of current system metric data to the trained anomaly detection supervisor model that compares the set of current system metric data to one or more sets of older system metric data, wherein the comparison results in an analysis of data drift in the anomaly detection model, and wherein the analysis of the data drift is one of the performance data that indicates whether the anomaly detection model is performing below the threshold.

7. The method of claim 1 further comprising:

inputting a set of current system metric data to the trained anomaly detection supervisor model that compares the set of current system metric data to one or more sets of older system metric data, wherein the comparison results in an analysis of data drift in the anomaly detection model, and wherein the analysis of the data drift is one of the performance data that indicates whether the anomaly detection model is performing below the threshold.

8. An information handling system comprising:

one or more processors;

a memory coupled to at least one of the processors;

a set of computer program instructions stored in the memory and executed by at least one of the processors in order to perform actions comprising:

outputting a set of current system data corresponding to a computer system and a set of current outputs from an anomaly detection model that is monitoring the computer system;

inputting the set of current system data and the set of current outputs to a trained anomaly detection supervisor model including inputting a set of current system log templates to the trained anomaly detection supervisor model that compares the set of current system log templates to one or more sets of older system log templates, wherein the comparison results in one of performance data that indicates whether the anomaly detection model is performing below a threshold;

receiving, from the trained anomaly detection supervisor model, a set of performance data corresponding to the anomaly detection model, wherein the received performance data is based on the set of current system data and the set of current outputs; and adjusting the anomaly detection model in response to the set of performance data indicating that the anomaly detection model is performing below the threshold.

9. The information handling system of claim 8 wherein the actions further comprise:

training an anomaly detection supervisor model, wherein the training results in the trained anomaly detection supervisor model, and wherein the training further comprises:

inputting a training inference dataset to the anomaly detection supervisor model, wherein the training inference dataset is an output of the anomaly detection model that is monitoring the computer system; and wherein the adjusting of the anomaly detection model is selected from the group consisting of retraining the anomaly detection model, changing one or more metrics used by the anomaly detection model, and changing one or more thresholds used by the anomaly detection model.

10. The information handling system of claim 9 wherein the actions further comprise:

receiving a current inference dataset that is output from the anomaly detection model that is monitoring the computer system; and using the trained anomaly detection supervisor model to compare the current inference dataset with one or more older inference datasets, wherein one of the older inference datasets is the training inference dataset, wherein the comparing results in one of the performance data that indicates whether the anomaly detection model is performing below the threshold.

11. The information handling system of claim 8 wherein the actions further comprise:

training an anomaly detection supervisor model, wherein the training results in the trained anomaly detection supervisor model, and wherein the training further comprises:

inputting a training reference count vector corresponding to a predetermined timeframe to the anomaly detection supervisor model, wherein the training reference count vector is an output of the anomaly detection model that is monitoring the computer system.

12. The information handling system of claim 11 wherein the actions further comprise:
receiving a reference count vector that is output from the anomaly detection model that is monitoring the computer system; and
using the trained anomaly detection supervisor model to compare the current reference count vector with one or more older reference count vectors, wherein one of the older reference count vectors is the training reference count vector, wherein the comparing results in one of the performance data that indicates whether the anomaly detection model is performing below the threshold.

13. The information handling system of claim 8 wherein the actions further comprise:
inputting a set of current system metric data to the trained anomaly detection supervisor model that compares the set of current system metric data to one or more sets of older system metric data, wherein the comparison results in an analysis of data drift in the anomaly detection model, and wherein the analysis of the data drift is one of the performance data that indicates whether the anomaly detection model is performing below the threshold.

14. The information handling system of claim 8 wherein the actions further comprise:
inputting a set of current system metric data to the trained anomaly detection supervisor model that compares the set of current system metric data to one or more sets of older system metric data, wherein the comparison results in an analysis of data drift in the anomaly detection model, and wherein the analysis of the data drift is one of the performance data that indicates whether the anomaly detection model is performing below the threshold.

15. A computer program product stored in a computer readable storage medium, comprising computer program code that, when executed by an information handling system, performs actions comprising:
outputting a set of current system data corresponding to a computer system and a set of current outputs from an anomaly detection model that is monitoring the computer system;
inputting the set of current system data and the set of current outputs to a trained anomaly detection supervisor model including inputting a set of current system log templates to the trained anomaly detection supervisor model that compares the set of current system log templates to one or more sets of older system log templates, wherein the comparison results in one of performance data that indicates whether the anomaly detection model is performing below a threshold:
receiving, from the trained anomaly detection supervisor model, a set of performance data corresponding to the anomaly detection model, wherein the received performance data is based on the set of current system data and the set of current outputs; and
adjusting the anomaly detection model in response to the set of performance data indicating that the anomaly detection model is performing below the threshold.

16. The computer program product of claim 15 wherein the actions further comprise:
training an anomaly detection supervisor model, wherein the training results in the trained anomaly detection supervisor model, and wherein the training further comprises:
inputting a training inference dataset to the anomaly detection supervisor model, wherein the training inference dataset is an output of the anomaly detection model that is monitoring the computer system; and
wherein the adjusting of the anomaly detection model is selected from the group consisting of retraining the anomaly detection model, changing one or more metrics used by the anomaly detection model, and changing one or more thresholds used by the anomaly detection model.

17. The computer program product of claim 16 wherein the actions further comprise:
receiving a current inference dataset that is output from the anomaly detection model that is monitoring the computer system; and
using the trained anomaly detection supervisor model to compare the current inference dataset with one or more older inference datasets, wherein one of the older inference datasets is the training inference dataset, wherein the comparing results in one of the performance data that indicates whether the anomaly detection model is performing below the threshold.

18. The computer program product of claim 15 wherein the actions further comprise:
training an anomaly detection supervisor model, wherein the training results in the trained anomaly detection supervisor model, and wherein the training further comprises:
inputting a training reference count vector corresponding to a predetermined timeframe to the anomaly detection supervisor model, wherein the training reference count vector is an output of the anomaly detection model that is monitoring the computer system.

19. The computer program product of claim 18 wherein the actions further comprise:
receiving a reference count vector that is output from the anomaly detection model that is monitoring the computer system; and
using the trained anomaly detection supervisor model to compare the current reference count vector with one or more older reference count vectors, wherein one of the older reference count vectors is the training reference count vector, wherein the comparing results in one of the performance data that indicates whether the anomaly detection model is performing below the threshold.

20. The computer program product of claim 15 wherein the actions further comprise:
inputting a set of current system metric data to the trained anomaly detection supervisor model that compares the set of current system metric data to one or more sets of older system metric data, wherein the comparison results in an analysis of data drift in the anomaly detection model, and wherein the analysis of the data drift is one of the performance data that indicates whether the anomaly detection model is performing below the threshold.

* * * * *